US012103157B2

(12) United States Patent
Hsieh

(10) Patent No.: US 12,103,157 B2
(45) Date of Patent: Oct. 1, 2024

(54) HAND TOOL

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 331 days.

(21) Appl. No.: 17/653,129

(22) Filed: Mar. 1, 2022

(65) Prior Publication Data

US 2022/0281096 A1 Sep. 8, 2022

Related U.S. Application Data

(60) Provisional application No. 63/156,363, filed on Mar. 4, 2021.

(51) Int. Cl.

| | |
|---|---|
| ***B25G 1/12*** | (2006.01) |
| ***B25B 13/04*** | (2006.01) |
| ***B25B 13/08*** | (2006.01) |
| ***B25B 13/46*** | (2006.01) |

(52) U.S. Cl.

CPC .............. *B25G 1/125* (2013.01); *B25B 13/04* (2013.01); *B25B 13/08* (2013.01); *B25B 13/462* (2013.01)

(58) Field of Classification Search

CPC .......... B25G 1/102; B25G 1/105; B25G 1/12; B25G 1/125; B25B 13/04; B25B 13/06; B25B 13/08; B25B 13/462; B25B 13/463

USPC .......................................... D8/17, 21, 27, 28

See application file for complete search history.

(56) References Cited

U.S. PATENT DOCUMENTS 2,466,884 A * 4/1949 English .................. B25B 13/08 81/177.6
2,484,492 A * 10/1949 Dingley .................. B25B 13/04 81/124.3
3,745,860 A * 7/1973 Bennett .................. B25B 13/04 81/124.4
5,062,328 A * 11/1991 Demurger ............... B25B 13/08 81/185
5,172,614 A * 12/1992 Monnet .................. B25G 1/105 81/177.1
5,713,251 A * 2/1998 Zurbuchen ............ B25B 13/461 81/61
6,318,216 B1 * 11/2001 Eggert .................. B25B 13/463 81/124.3
8,122,790 B1 * 2/2012 Johnson, Sr. ......... B25B 13/463 81/60
8,136,427 B2 * 3/2012 James .................... B25G 1/063 81/176.1
9,586,389 B2 * 3/2017 Riggen ................... B32B 37/18
9,975,223 B2 * 5/2018 Chen ..................... B25B 13/463

(Continued)

*Primary Examiner* — David B. Thomas
(74) *Attorney, Agent, or Firm* — CKC & Partners Co., LLC

(57) ABSTRACT

A hand tool includes a first driving element, a second driving element and at least one connecting element. The first driving element includes a first driving portion and a first staggered portion. The first driving portion is connected to the first staggered portion integrally. The second driving element does not contact the first driving element and includes a second driving portion and a second staggered portion. The second driving portion is connected to the second staggered portion integrally. The connecting element connects the first staggered portion and the second staggered portion, wherein the connecting element is made of insulating material.

8 Claims, 6 Drawing Sheets

(56) References Cited

U.S. PATENT DOCUMENTS

| | | | | |
|---|---|---|---|---|
| 11,027,400 | B2 * | 6/2021 | Raskin | B25G 1/125 |
| 11,318,586 | B2 * | 5/2022 | Batsa | B25B 23/00 |
| 11,351,664 | B2 * | 6/2022 | Batsa | F16D 3/74 |
| 11,446,795 | B2 * | 9/2022 | Chen | B25B 13/08 |
| 11,565,383 | B2 * | 1/2023 | Mesnil | B25B 13/065 |
| 11,565,385 | B2 * | 1/2023 | Lai | B25B 13/465 |
| 2002/0011136 | A1 * | 1/2002 | Eggert | B25B 13/463<br>81/125.1 |
| 2012/0042754 | A1 * | 2/2012 | Chen | B25B 15/008<br>81/180.1 |
| 2012/0174718 | A1 * | 7/2012 | James | B25B 13/08<br>81/177.1 |
| 2013/0341069 | A1 * | 12/2013 | Demaretz | F16D 3/78<br>174/138 R |
| 2014/0345428 | A1 * | 11/2014 | Buchanan | B25G 1/043<br>81/177.2 |
| 2016/0271787 | A1 * | 9/2016 | Sakmar, III | B25G 1/125 |
| 2017/0001285 | A1 * | 1/2017 | Chen | B25B 13/08 |
| 2020/0376635 | A1 * | 12/2020 | Raskin | H01B 17/56 |
| 2022/0088754 | A1 * | 3/2022 | Batsa | B25B 13/06 |

* cited by examiner

HAND TOOL

RELATED APPLICATIONS

This application claims priority to U.S. Provisional Application Ser. No. 63/156,363, filed Mar. 4, 2021, which is herein incorporated by reference.

BACKGROUND

Technical Field

The present disclosure relates to a hand tool.

Description of Related Art

In order to adapt in the various working environment, the practitioner develops a hand tool of which the different driving elements are disposed on two ends, such as a ratchet-open ended wrench with the two heads, so as to prevent a user from alternating different hand tools and improve the operating convenience. However, in the extreme working environment such as the working environment with a high electrical voltage or high current equipment, because the conventional two-headed hand tool is an integrally formed structure, when the user operates one end of the hand tool, the other end of the hand tool can probably accidentally touch the equipment with high voltage or high current. In results, the equipment can be short-circuited, and even the user's life can be in danger.

Accordingly, a hand tool which can improve the safety in the extreme working environment is still a pursued target of practitioners.

SUMMARY

According to one aspect of the present disclosure, a hand tool includes a first driving element, a second driving element and at least one connecting element. The first driving element includes a first driving portion and a first staggered portion. The first driving portion is connected to the first staggered portion integrally. The second driving element does not contact the first driving element and includes a second driving portion and a second staggered portion. The second driving portion is connected to the second staggered portion integrally. The connecting element connects the first staggered portion and the second staggered portion, wherein the connecting element is made of insulating material.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
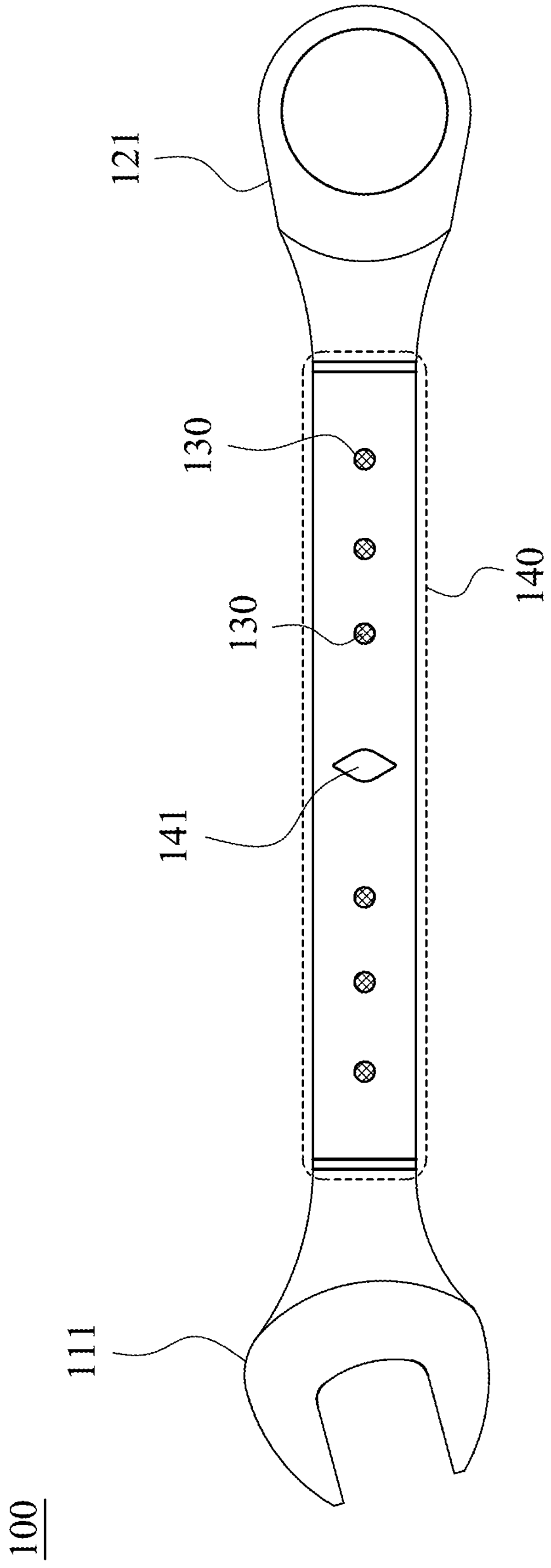
FIG. 1 shows a schematic view of a hand tool according to the 1st embodiment of the present disclosure.
Figure 2:
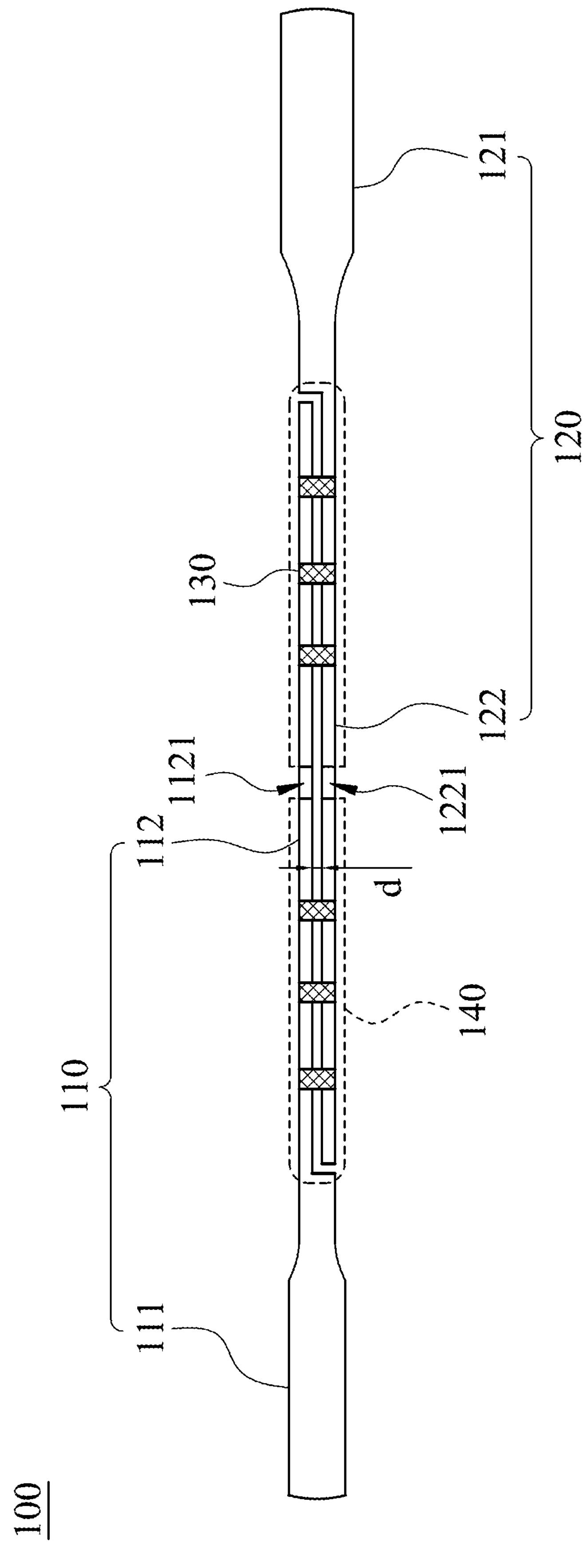
FIG. 2 shows a cross-sectional view of the hand tool according to the 1st embodiment in FIG. 1.

FIG. 1 shows a schematic view of a hand tool 100 according to the 1st embodiment of the present disclosure. FIG. 2 shows a cross-sectional view of the hand tool 100 according to the 1st embodiment in FIG. 1. As shown in FIGS. 1 and 2, the hand tool 100 includes a first driving element 110, a second driving element 120 and at least one connecting element 130. The first driving element 110 includes a first driving portion 111 and a first staggered portion 112. The first driving portion 111 is connected to the first staggered portion 112 integrally. The second driving element 120 does not contact the first driving element 110 and includes a second driving portion 121 and a second staggered portion 122. The second driving portion 121 is connected to the second staggered portion 122 integrally. The connecting element 130 connects the first staggered portion 112 and the second staggered portion 122, wherein the connecting element 130 is made of insulating material.

By connecting the first driving element 110 and the second driving element 120 via the connecting element 130 made of insulating material, the electrical conduction between the first driving element 110 and the second driving element 120 can be prevented while the connecting strength between the first driving element 110 and the second driving element 120 can be provided. When a user operates an end of the hand tool 100 (it can be the first driving element 110 or the second driving element 120) in the working environment with high electrical voltage or high current, the insulating design of the connecting element 130 can prevent the user from the life-threatening danger caused by accidental touching an exposed electrical wire or an item with high voltage or current by the other end of the hand tool 100. Hence, the safety in the extreme working environment can be improved and the operating stability of the hand tool 100 can be maintained.

In specific, the hand tool 100 can further include a cover 140. The staggered portion 112 and the second staggered portion 122 are disposed in the cover 140. In detail, both the first driving portion 111 and the second driving portion 121 are exposed beyond the cover 140. The staggered portion 112 and the second staggered portion 122 are covered by the cover 140, which can further improve the connecting strength between the first driving element 110 and the second driving element 12. Hence, the possibility of detaching the first driving element 110 and the second driving element 120 of the hand tool 100 by external forces can be reduced.

As shown in FIGS. 1 and 2, the cover 140 can have a through hole 141, the first staggered portion 112 and the second staggered portion 122 have openings 1121, 1221, respectively, and the openings 1121, 1221 of each of the first staggered portion 112 and the second staggered portion 122 and the through hole 141 correspond to each other. When the user does not operate the hand tool 100, the hand tool 100 can be hung on a hook via the openings 1121, 1221 and the through hole 141 and can be taken out for using so as to improve the operating convenience.

As shown in FIG. 2, the first staggered portion 112 can be parallel to the second staggered portion 122, and a gap is between the first staggered portion 112 and the second staggered portion 122. In detail, a cross section of each of the first staggered portion 112 and the second staggered portion 122 in the cover 140 can be a substantial L-shape which corresponds to each other. Moreover, the first staggered portion 112 and the second staggered portion 122 can have at least one first connecting hole and at least one second connecting hole, respectively, and the first connecting hole and the second connecting hole correspond to each other. The connecting element 130 is inserted through the first connecting hole and the second connecting hole so as to connect the first staggered portion 112 and the second staggered portion 122. In the 1st embodiment, a number of each of the connecting element 130, the first connecting hole and the second connecting hole is 6, but the present disclosure is not limited thereto. The first connecting holes and the second connecting holes are located evenly on the first staggered portion 112 and the second staggered portion 122, respectively, so that each of the connecting elements 130 connects the first staggered portion 112 and the second staggered portion 122 evenly. Hence, the first driving element 110 and the second driving element 120 can be connected firmly for preventing from detachment caused by the exceeding force during operation. Moreover, a distance d of the gap provides an enough space between the first staggered portion 112 and the second staggered portion 122 for preventing the conduction between the first driving element 110 and the second driving element 120 due to electrical breakdown, and the distance d of the gap maintains the connecting strength between the first staggered portion 112 and the second staggered portion 122.

Furthermore, each of the connecting elements 130 can be made by any material which is insulated and can be cylindrical substantially. The connecting elements 130 can be adhered to the first staggered portion 112 and the second staggered portion 122 via spot gluing, but the present disclosure is not limited thereto.

Moreover, each of the first driving portion 111 and the second driving portion 121 can be one of a ratchet wrench, an open-ended wrench, a sleeve wrench and a sleeve. According to the first embodiment, the first driving portion 111 is an open-ended wrench, the second driving portion 121 is a sleeve wrench, but the present disclosure is not limited thereto. Hence, the user can adjust the first driving portion 111 and the second driving portion 121 according to requirements for operation.

Figure 3:
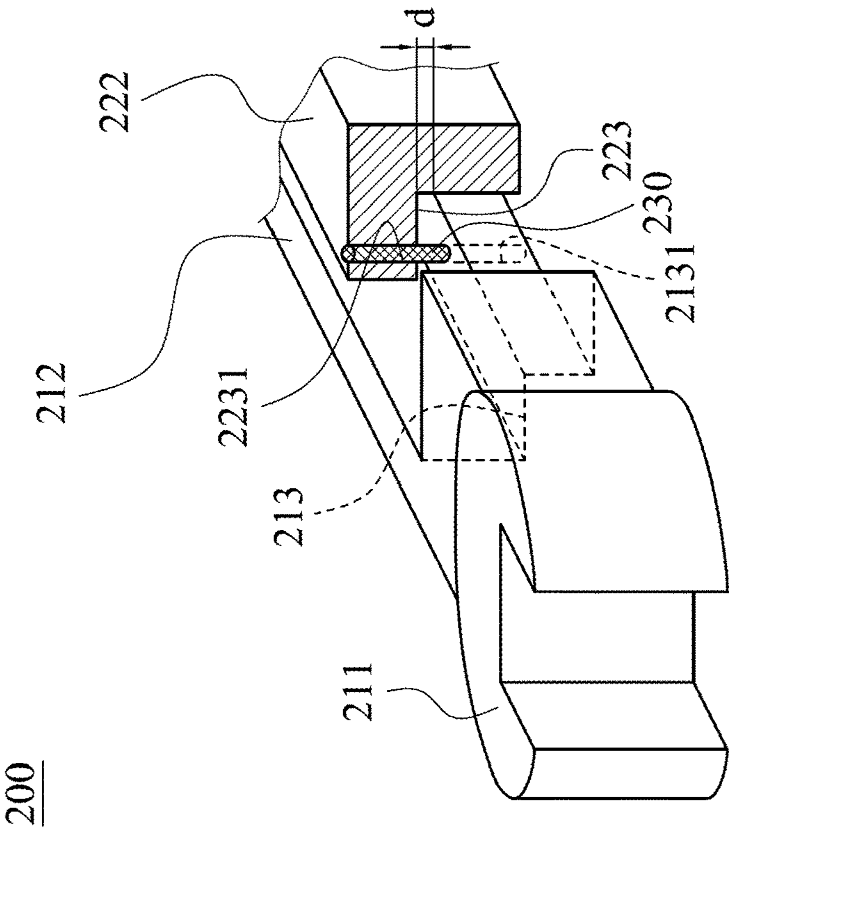
FIG. 3 shows a partial cross-sectional view of a hand tool according to the 2nd embodiment of the present disclosure.

FIG. 3 shows a partial cross-sectional view of a hand tool 200 according to the 2nd embodiment of the present disclosure. A structure of the hand tool 200 of the 2nd embodiment is similar with the hand tool 100 of the 1st embodiment, so the detail of the hand tool 200 will not be described herein. Particularly, in the 2nd embodiment, a first staggered portion 212 can include a first staggered surface 213, and first connecting holes 2131 penetrate through the first staggered surface 213. A second staggered portion 222 can include a second staggered surface 223, and second connecting holes 2231 penetrate through the second staggered surface 223. Connecting elements 230 connect the first staggered surface 213 and the second staggered surface 223. Furthermore, parts of each of the connecting elements 230 are inserted in each of the first connecting holes 2131 of the first staggered surface 213 and each of the second connecting holes 2231 of the second staggered surface 223, and each of the connecting elements 230 penetrate through the first staggered surface 213 and the second staggered surface 223. In detail, each of the first staggered portion 212 and the second staggered portion 222 is a substantially L-shaped structure corresponding to each other. Via the connecting elements 230 inserted through the first connecting holes 2131 and the second connecting holes 2231, the first staggered surface 213 can be connected to the second staggered surface 223 without contact, and the impact resistance of the first staggered portion 212 and the second staggered portion 222 can be improved via the design of the L-shaped structure. Hence, when the user handles the hand tool 200 and operates a first driving portion 211 or a second driving portion (not shown) to work, the hand tool 200 can apply the force effectively on an external working element to improve the operating fluency.

It has to be mentioned that a number of each of the connecting elements 230, the first connecting holes 2131 and the second connecting holes 2231 can be three, four, five, six, or above, but the present disclosure is not limited thereto.

As shown in FIG. 3, a gap is between the first staggered portion 212 and the second staggered portion 222. In detail, a distance d of the gap is a distance between the first staggered surface 213 and the second staggered surface 223.

Figure 4:
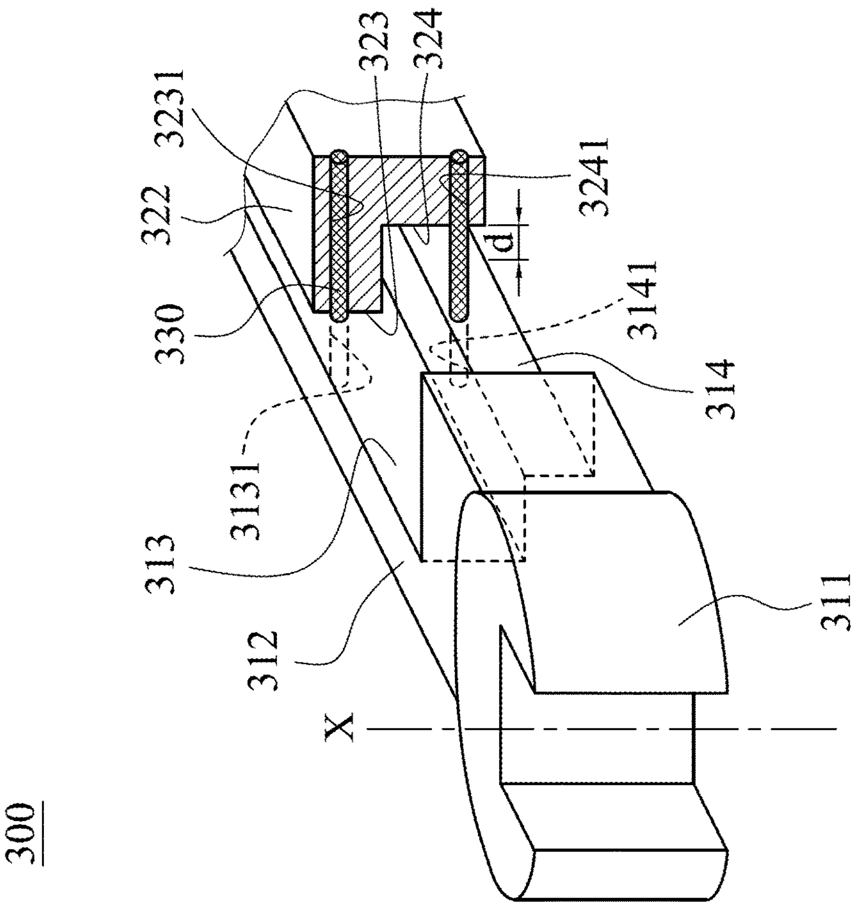
FIG. 4 shows a partial cross-sectional view of a hand tool according to the 3rd embodiment of the present disclosure.

FIG. 4 shows a partial cross-sectional view of a hand tool 300 according to the 3rd embodiment of the present disclosure. A structure of the hand tool 300 of the 3rd embodiment is similar with the hand tool 200 of the 2nd embodiment, so the detail of the hand tool 300 will not be described herein. Particularly, in the 3rd embodiment, a number of each of connecting elements 330, first connecting holes 3131, 3141 and second connecting holes 3231, 3241 is plural. A first staggered portion 312 can include a first step surface 313 and a second step surface 314. The first connecting holes 3131 penetrate through the first step surface 313, and the other first connecting holes 3141 penetrate through the second step surface 314. A second staggered portion 322 includes a third step surface 323 and a fourth step surface 324, the first step surface 313 and the second step surface 314 correspond to the third step surface 323 and the fourth step surface 324, respectively. The second connecting holes 3231 penetrate through the third step surface 323, and the other second connecting holes 3241 penetrate through the fourth step surface 324. Each of the connecting elements 330 is inserted through each of the first connecting holes 3131 and each of the second connecting holes 3231 so as to connect the first step surface 313 and the third step surface 323, and each of the other connecting elements 330 is inserted through each of the other first connecting holes 3141 and each of the other second connecting holes 3241 so as to connect the second step surface 314 and the fourth step surface 324. By disposing the two connecting elements 330 at the same direction, the connecting strength between the first staggered portion 312 and the second staggered portion 322 can be further improved.

Furthermore, a shape of each of the connecting elements 330 is a cylinder, the shape thereof can also be other shapes to fit a shape of each of the first connecting holes 3131, 3141 and the second connecting holes 3231, 3241, but the present disclosure is not limited thereto. Because a direction of the connecting elements 330 connecting the first staggered portion 312 and the second staggered portion 322 is parallel to a radial direction of a driving axis X of a first driving portion 311, the loading of the connecting elements 330 can be improved while the user operating the first driving portion 311 to apply the force on the connecting elements 330 along a long-side direction. Hence, the possibility of breaking the connecting elements 330 by forces can be reduced.

As shown in FIG. 4, a gap is between the first staggered portion 312 and the second staggered portion 322. In detail, the gaps are between the first step surface 313 and the third step surface 323 and between the second step surface 314 and the fourth step surface 324, respectively. A distance of the gap between the first step surface 313 and the third step surface 323 equals to a distance d of the gap between the second step surface 314 and the fourth step surface 324.

Figure 5:
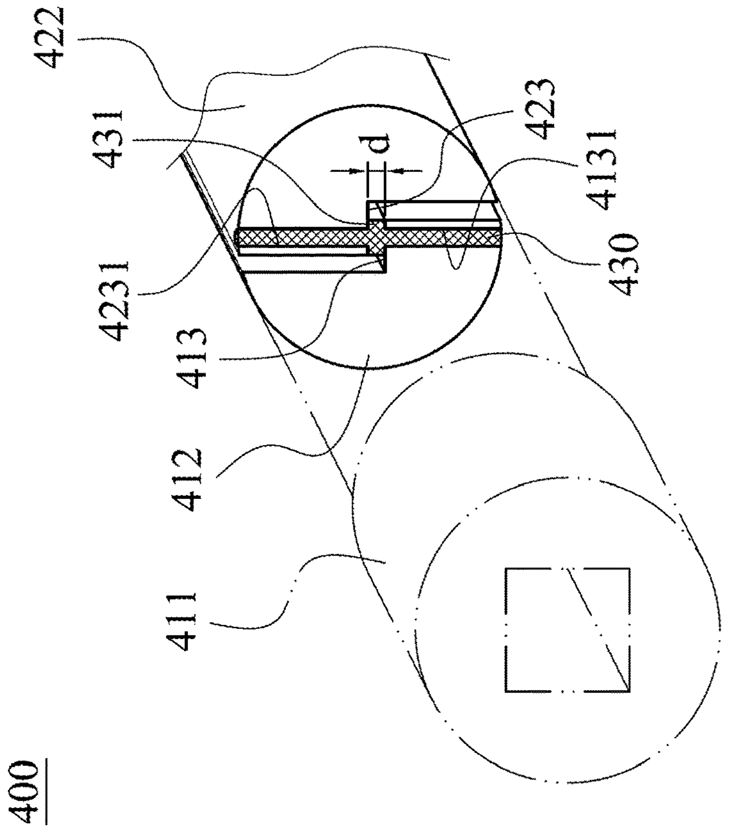
FIG. 5 shows a partial cross-sectional view of a hand tool according to the 4th embodiment of the present disclosure.

FIG. 5 shows a partial cross-sectional view of a hand tool 400 according to the 4th embodiment of the present disclosure. As shown in FIG. 5, the hand tool 400 includes a first driving element (its reference numeral is omitted), a second driving element (its reference numeral is omitted) and at least one connecting element 430. The first driving element includes a first driving portion 411 and a first staggered portion 412. The first driving portion 411 is connected to the first staggered portion 412 integrally. The second driving element does not contact the first driving element and includes a second driving portion (not shown) and a second staggered portion 422. The second driving portion is connected to the second staggered portion 422 integrally. The connecting element 430 connects the first staggered portion 412 and the second staggered portion 422, wherein the connecting element 430 is made of insulating material.

Specifically, each of the first driving portion 411 and the second driving portion is a sleeve. Furthermore, the hand tool 400 can be in shape of cylinder substantially by connecting the first staggered portion 412 and the second staggered portion 422, so that the hand tool 400 can be used as a whole sleeve, but the present disclosure is not limited thereto. Moreover, the first staggered portion 412 and the second staggered portion 422 include a first connecting hole 4131 and a second connecting hole 4231, respectively, so that the connecting element 430 can be inserted into the first connecting hole 4131 and the second connecting hole 4231 for connecting the first staggered portion 412 and the second staggered portion 422. The first staggered portion 412 includes a first staggered surface 413, and the first connecting hole 4131 penetrates through the first staggered surface 413. The second staggered portion 422 includes a second staggered surface 423, and the second connecting hole 4231 penetrates through the second staggered surface 423. Hence, the first driving element can stay insulated from the second driving element.

As shown in FIG. 5, a gap is between the first staggered portion 412 and the second staggered portion 422. In detail, a distance d of the gap is a distance between the first staggered surface 413 and the second staggered surface 423.

Moreover, the connecting element 430 can have a section 431, the section 431 is exposed beyond the first staggered portion 412 and the second staggered portion 422 (that is, located in the aforementioned gap), and a thickness of the section 431 is greater than a diameter of each of the first connecting hole 4131 and the second connecting hole 4231. In other words, the section 431 of the connecting element 430, which is located between the first staggered portion 412 and the second staggered portion 422, is thicker than the other parts of the connecting element 430 which are located in the first staggered portion 412 or the second staggered portion 422. Hence, the connecting element 430 can abut against the first staggered surface 413 and the second staggered surface 423 at the same time so as to further improve the connecting strength of the connecting element 430 for connecting the first staggered portion 412 and the second staggered portion 422.

Figure 6:
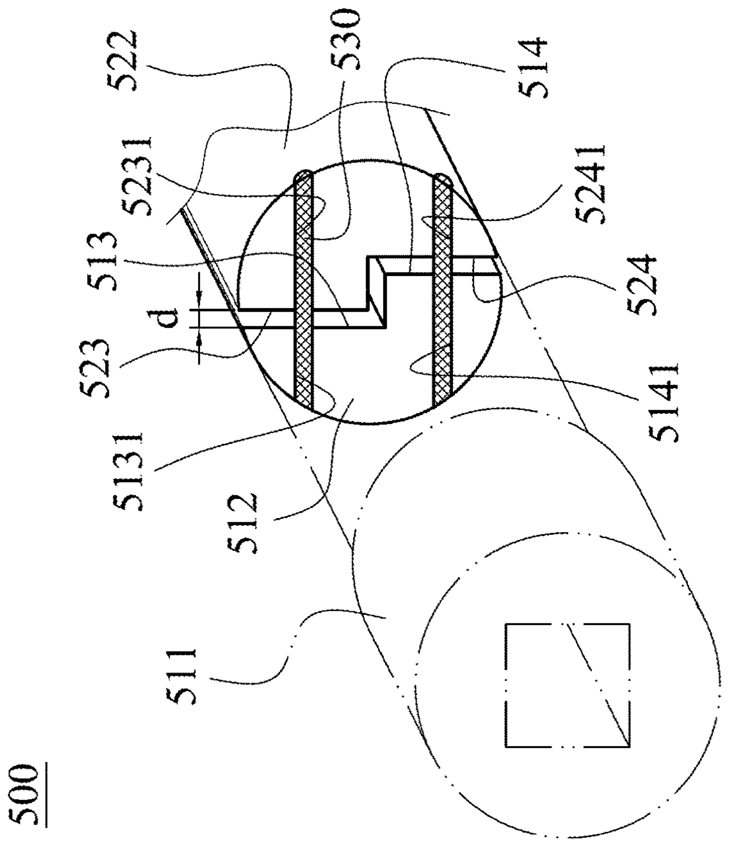
FIG. 6 shows a partial cross-sectional view of a hand tool according to the 5th embodiment of the present disclosure.

FIG. 6 shows a partial cross-sectional view of a hand tool 500 according to the 5th embodiment of the present disclosure. A structure of the hand tool 500 of the 5th embodiment is similar with the hand tool 400 of the 4th embodiment, so the detail of the hand tool 500 will not be described herein. Particularly, in the 5th embodiment, a number of each of connecting elements 530, first connecting holes 5131, 5141 and second connecting holes 5231, 5241 is plural. A first staggered portion 512 can include a first step surface 513 and a second step surface 514. The first connecting holes 5131 penetrate through the first step surface 513, and the other first connecting holes 5141 penetrate through the second step surface 514. A second staggered portion 522 includes a third step surface 523 and a fourth step surface 524, the first step surface 513 and the second step surface 514 correspond to the third step surface 523 and the fourth step surface 524, respectively. The second connecting holes 5231 penetrate through the third step surface 523, and the other second connecting holes 5241 penetrate through the fourth step surface 524. Each of the connecting elements 530 is inserted through each of the first connecting holes 5131 and each of the second connecting holes 5231 so as to connect the first step surface 513 and the third step surface 523, and each of the other connecting elements 530 is inserted through each of the other first connecting holes 5141 and each of the other second connecting holes 5241 so as to connect the second step surface 514 and the fourth step surface 524. By disposing two of the connecting elements 530 at the same direction, the connecting strength between the first staggered portion 512 and the second staggered portion 522 can be further improved. Hence, the possibility of detaching by applying too much force during operating a first driving portion 511 or a second driving portion (its reference numeral is omitted) can be reduced.

As shown in FIG. 6, a gap is between the first staggered portion 512 and the second staggered portion 522. In detail, the gaps are between the first step surface 513 and the third step surface 523 and between the second step surface 514 and the fourth step surface 524, respectively. A distance of the gap between the first step surface 513 and the third step surface 523 equals to a distance d of the gap between the second step surface 514 and the fourth step surface 524.

Figure 7:
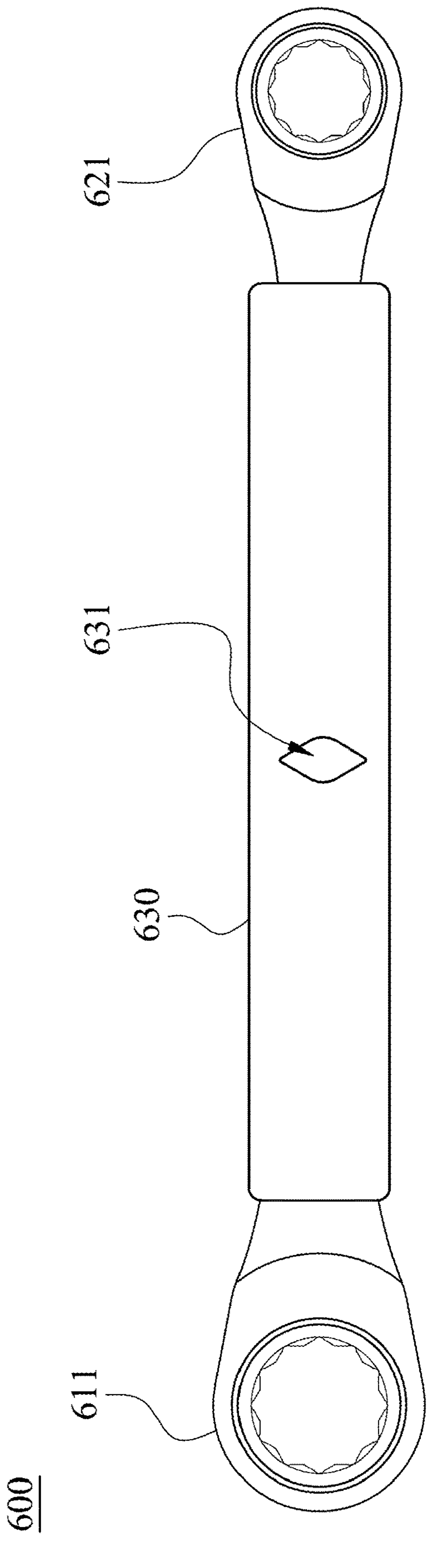
FIG. 7 shows a schematic view of a hand tool according to the 6th embodiment of the present disclosure.
Figure 8:
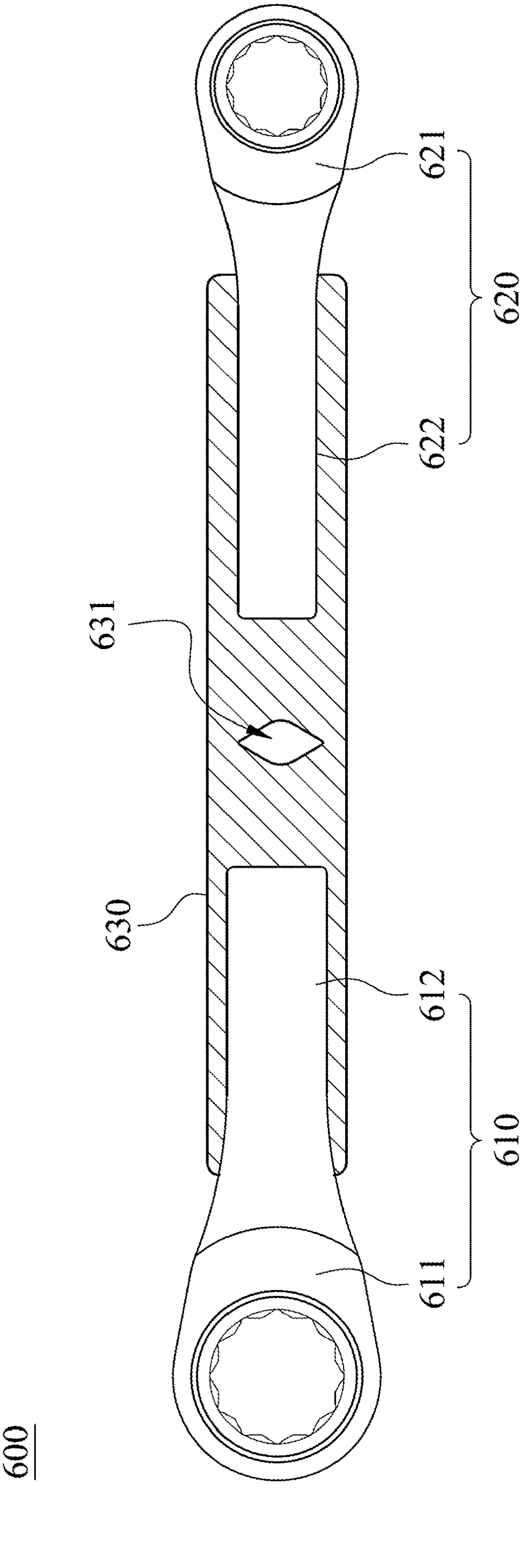
FIG. 8 shows a cross-sectional view of the hand tool according to the 6th embodiment in FIG. 7.

FIG. 7 shows a schematic view of a hand tool 600 according to the 6th embodiment of the present disclosure. FIG. 8 shows a cross-sectional view of the hand tool 600 according to the 6th embodiment in FIG. 7. As shown in FIGS. 7 and 8, the hand tool 600 includes a first driving element 610, a second driving element 620 and at least one connecting element. The first driving element 610 includes a first driving portion 611 and a first staggered portion 612. The first driving portion 611 is connected to the first staggered portion 612 integrally. The second driving element 620 does not contact the first driving element 610 and includes a second driving portion 621 and a second staggered portion 622. The second driving portion 621 is connected to the second staggered portion 622 integrally. The connecting element connects the first staggered portion 612 and the second staggered portion 622, wherein the connecting element 130 is made of insulating material.

In the 6th embodiment, the connecting element is a cover 630. The first staggered portion 612 is connected to one end of the cover 630, and the second staggered portion 622 is connected to the other end of the cover 630. In other words, the first staggered portion 612 and the second staggered portion 622 are covered in the two ends of the cover 630, respectively. As insulating material, the cover 630 insulates the first driving element 610 from the second driving element 620. Hence, the manufacturing process can be simplified, and it is favorable for mass production in industry.

Moreover, the cover 630 can have a through hole 631, and each of the first staggered portion 612 and the second staggered portion 622 has an opening (not shown), and the opening of each of the first staggered portion 612 and the second staggered portion 622 correspond to each other. When the user does not operate the hand tool 600, the hand tool 600 can be hung on a hook and can be taken out for using so as to improve the operating convenience.

As shown in the aforementioned embodiments, the present disclosure provides a hand tool which has the following advantages. First, via the connecting element made of insulating material connecting the first driving element and the second driving element, the safety in the extreme working environment can be improved and the operating stability of the hand tool can be maintained. Second, via the configuration of the step surfaces and disposition of the connecting element, the connecting strength and the operating fluency can be further improved. Third, via the thicker connecting element located at the gap, the connecting strength can be further improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A hand tool, comprising:

a first driving element, comprising:
  a first driving portion; and
  a first staggered portion having at least one first connecting hole and comprising a first staggered surface, wherein the first driving portion is connected to the first staggered portion integrally, and the at least one first connecting hole penetrates through the first staggered surface;

a second driving element, wherein the second driving element does not contact the first driving element, and the second driving element comprises:
  a second driving portion; and
  a second staggered portion having at least one second connecting hole and comprising a second staggered surface, wherein the second driving portion is connected to the second staggered portion integrally, and the at least one second connecting hole penetrates through the second staggered surface; and at least one connecting element connecting the first staggered portion and the second staggered portion, wherein the at least one connecting element is made of insulating material, and is inserted through the at least one first connecting hole and the at least one second connecting hole so as to connect the first staggered portion and the second staggered portion.

2. The hand tool of claim 1, further comprising a cover, wherein the first staggered portion and the second staggered portion are disposed in the cover.

3. The hand tool of claim 2, wherein the cover has a through hole, each of the first staggered portion and the second staggered portion has an opening, and the opening of each of the first staggered portion and the second staggered portion and the through hole correspond to each other.

4. The hand tool of claim 1, wherein the first staggered portion is parallel to the second staggered portion, and a gap is between the first staggered portion and the second staggered portion.

5. The hand tool of claim 1, wherein the at least one connecting element has a section, the section is exposed beyond the first staggered portion and the second staggered portion, and a thickness of the section is larger than a diameter of each of the at least one first connecting hole and the at least one second connecting hole.

6. The hand tool of claim 1, wherein a number of each of the at least one connecting element, the at least one first connecting hole and the at least one second connecting hole is plural; the first staggered portion comprises a first step surface and a second step surface, one of the first connecting holes penetrates through the first step surface, and another one of the first connecting holes penetrates through the second step surface; the second staggered portion comprises a third step surface and a fourth step surface, the first step surface and the second step surface correspond to the third step surface and the fourth step surface, respectively, one of the second connecting holes penetrates through the third step surface, and another one of the second connecting holes penetrates through the fourth step surface; one of the connecting elements is inserted through the one of the first connecting holes and the one of the second connecting holes so as to connect the first step surface and the third step surface, and another one of the connecting elements is inserted through the another one of the first connecting holes and the another one of the second connecting holes so as to connect the second step surface and the fourth step surface.

7. The hand tool of claim 1, wherein each of the first driving portion and the second driving portion is one of a ratchet wrench, an open-ended wrench, a sleeve wrench and a sleeve.

8. The hand tool of claim 1, wherein the at least one connecting element is a cover, the first staggered portion is connected to one end of the cover, and the second staggered portion is connected to the other end of the cover.

* * * * *